(12) United States Patent
Xia et al.

(10) Patent No.: US 10,331,179 B1
(45) Date of Patent: Jun. 25, 2019

(54) ANTENNA SYSTEM AND MOBILE TERMINAL

(71) Applicant: AAC Technologies Pte. Ltd., Singapore (SG)

(72) Inventors: Xiaoxue Xia, Shenzhen (CN); Chao Wang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 16/055,945

(22) Filed: Aug. 6, 2018

(30) Foreign Application Priority Data

Dec. 13, 2017 (CN) .......................... 2017 1 1326062

(51) Int. Cl.
| | |
|---|---|
| *G06F 1/00* | (2006.01) |
| *G06F 1/16* | (2006.01) |
| *H01Q 21/00* | (2006.01) |
| *H01Q 1/44* | (2006.01) |
| *H01Q 1/24* | (2006.01) |

(52) U.S. Cl.
CPC .......... *G06F 1/1698* (2013.01); *H01Q 1/241* (2013.01); *H01Q 1/44* (2013.01); *H01Q 21/0006* (2013.01)

(58) Field of Classification Search
CPC ........ G06F 1/1698; H01Q 1/241; H01Q 1/44; H01Q 1/0006
See application file for complete search history.

(56) References Cited

U.S. PATENT DOCUMENTS

| | | | | |
|---|---|---|---|---|
| 10,165,426 | B1* | 12/2018 | Jiang ..................... | H04W 16/28 |
| 2015/0123859 | A1* | 5/2015 | Kodama ................ | H01Q 1/243 |
| | | | | 343/702 |
| 2016/0087348 | A1* | 3/2016 | Ko ........................ | H01Q 21/245 |
| | | | | 455/73 |
| 2017/0141465 | A1* | 5/2017 | Sharawi .................. | H01Q 1/48 |
| 2018/0309198 | A1* | 10/2018 | Yu .......................... | H01Q 1/243 |

* cited by examiner

*Primary Examiner* — Khai M Nguyen
(74) *Attorney, Agent, or Firm* — Na Xu; IPro, PLLC (57) ABSTRACT

The present disclosure discloses an antenna system and a mobile terminal. The antenna system is applied to the mobile terminal and includes a first feeding point, a first millimeter-wave array antenna electrically connected to the first feeding point, a second feeding point, a second millimeter-wave array antenna electrically connected to the second feeding point, a third feeding point, a third millimeter-wave array antenna electrically connected to the third feeding point, a fourth feeding point and a fourth millimeter-wave array antenna electrically connected to the fourth feeding point, which are all arranged on a circuit board. Beams of the first millimeter-wave array antenna cover a space of Z>0; beams of the second millimeter-wave array antenna cover a space of Z<0; beams of the third millimeter-wave array antenna cover a space of X>0; and beams of the fourth millimeter-wave array antenna cover a space of X<0.

9 Claims, 12 Drawing Sheets

ANTENNA SYSTEM AND MOBILE TERMINAL

CROSS-REFERENCE TO RELATED APPLICATIONS

The present application claims priority to Chinese Patent Application No. 201711326062.1, filed on Dec. 13, 2017, the content of which is incorporated herein by reference in its entirety.

TECHNICAL FIELD

The embodiments of the present disclosure relate to the field of communications, and in particular, to an antenna system and a mobile terminal.

BACKGROUND

With the constant development of communication technologies, the Fifth-Generation mobile communication technology (5G) may be seen behind cool hot technologies such as a virtual reality technology, an unmanned aerial vehicle technology, and an autopilot technology. The fifth-generation mobile communication technology is an extension of 4G and is currently under study. The theoretical downlink speed of the 5G network is 10 Gb/s (which is equivalent to a download speed of 1.25 GB/s). In terms of capacity, the mobile data traffic per unit area of 5G is increased by 1000 times than 4G. In terms of transmission rate, the typical user data rate is increased by 10 to 100 times and the peak transmission rate may reach 10 Gbps (which is 100 Mbps in 4G). It can be seen therefrom that 5G will fully surpass 4G in all aspects to achieve the true fusion network.

The International Telecommunication Union (ITU) defined main application scenarios of 5G at the ITU-RWPSD 22nd meeting held on June 2015. The ITU defined three main application scenarios: enhanced mobile broadband, large-scale machine communications, and highly-reliable low-latency communications. These three application scenarios respectively correspond to different key indicators. Under the enhanced mobile bandwidth scenario, the user peak speed is 20 Gbps, and the minimum user experience rate is 100 Mbps. Many key technologies, such as a millimeter-wave technology and a beam-forming technology, are adopted in 5G communication to achieve the above indicators. Rich bandwidth resources of a millimeter-wave frequency band provide guarantees for high-speed transmission rates. However, due to the severe space loss of electromagnetic waves at this frequency band, phased array architecture is needed for a wireless communication system using the millimeter-wave frequency band. By means of a phase shifter, the phases of various array elements are distributed according to a certain rule, thereby forming a high-gain beam. In addition, by changing the phase shift, the beam is scanned within a certain space range.

In the beam-forming technology of 5G communication, a base station side has multiple antennas and may automatically adjust phases of transmitted signals of the antennas to form a superposition of electromagnetic waves at a terminal receiving point, thereby improving the strength of received signals. The inventor has found that the related art at least has the following problems: a 5G terminal also needs to use a millimeter-wave phased array antenna and has a phased array of N*N dot matrix. However, this phased array takes up a large space of a mobile phone and is not easy to deploy, and the setting of the scanning angle of this phased array is complex. Since the scanning coverage of a single phased array antenna is generally smaller than a hemisphere, if the 5G terminal adopts the single phased array antenna, it may cause a problem that a smart terminal is unstable in signal receiving.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to make the objectives, technical solutions, and advantages of the present disclosure more clear, various embodiments of the present disclosure are described in detail below with reference to the accompanying drawings. It may be understood by an ordinary person skilled in the art that many technical details are set forth in various embodiments of the present disclosure to give the reader a fuller understanding of the present disclosure. However, even though these technical details, and various changes and modifications based on the following embodiments are not set forth, the claimed technical solution of the present disclosure may be implemented.

Figure 1:
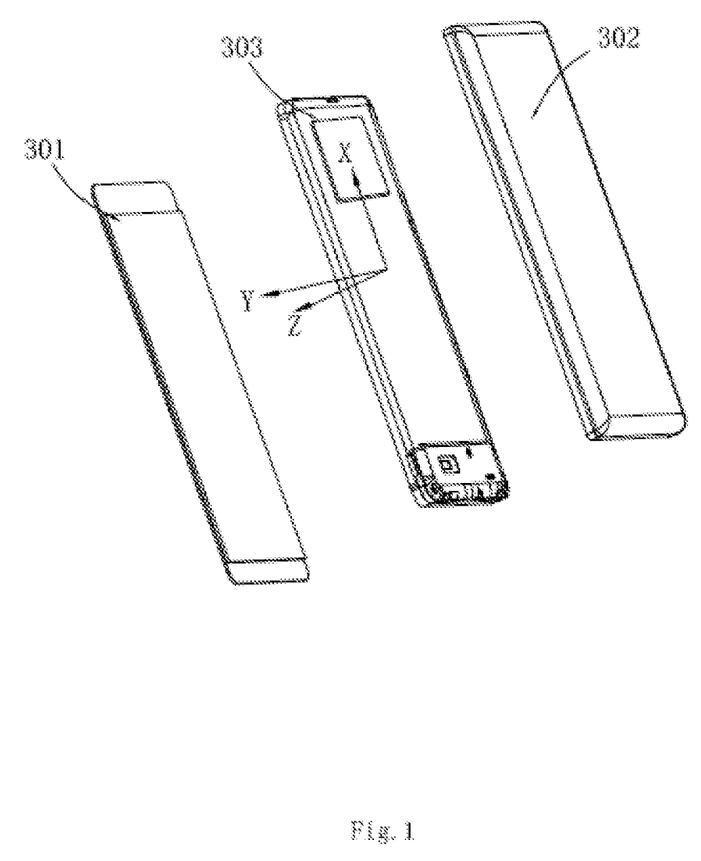
FIG. 1 is an exploded diagram of a mobile terminal to which an antenna system provided according to the first embodiment of the present disclosure is applied.

The first embodiment of the present disclosure relates to an antenna system 10. The antenna system 10 is applied to a mobile terminal. The mobile terminal is provided with a screen 301, a back shell 302 opposite to the screen 301, and a circuit board 303 sandwiched between the screen 301 and the back shell 302, as shown in FIG. 1 which is an exploded view. The mobile terminal may be a smart phone, a smart watch and the like. In this embodiment, the mobile terminal is illustrated as the smart phone.

The antenna system includes a first feeding point 101, a first millimeter-wave array antenna 102 electrically connected to the first feeding point 101, a second feeding point 103, a second millimeter-wave array antenna 104 electrically connected to the second feeding point 103, a third feeding point 105, a third millimeter-wave array antenna 106 electrically connected to the third feeding point 105, a fourth feeding point 107 and a fourth millimeter-wave array antenna 108 electrically connected to the fourth feeding point 107, which all are arranged on the circuit board 303.

For convenience of description, it is assumed that the mobile terminal is placed in a three-dimensional coordinate system which takes the center of the mobile terminal as an origin. An X axis of the three-dimensional coordinate system extends along a major-axis direction of the mobile terminal. A Y axis of the three-dimensional coordinate system extends along a minor-axis direction of the mobile terminal. A Z axis of the three-dimensional coordinate system extends along a thickness direction of the mobile terminal. A positive axis of the X axis points to the top of the mobile terminal. A positive axis of the Z axis points to the screen.

Figure 2A:
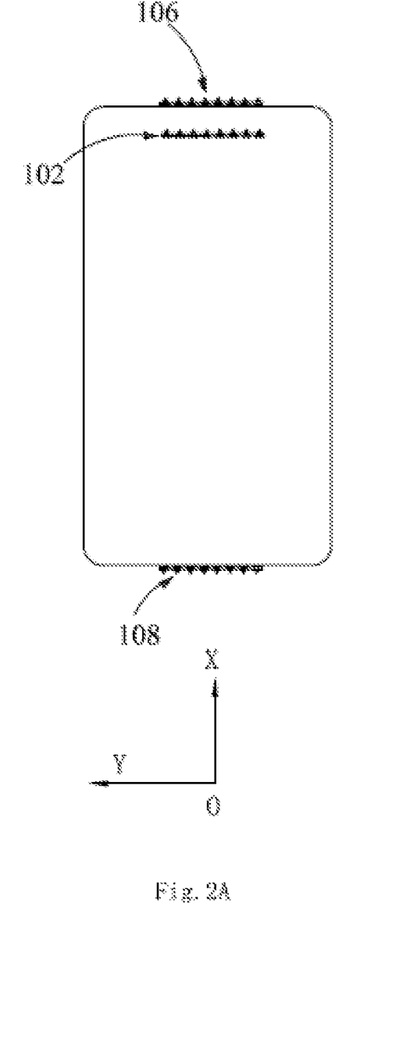
FIG. 2A is a diagram of the front face of the mobile terminal provided by the first embodiment.
Figure 2B:
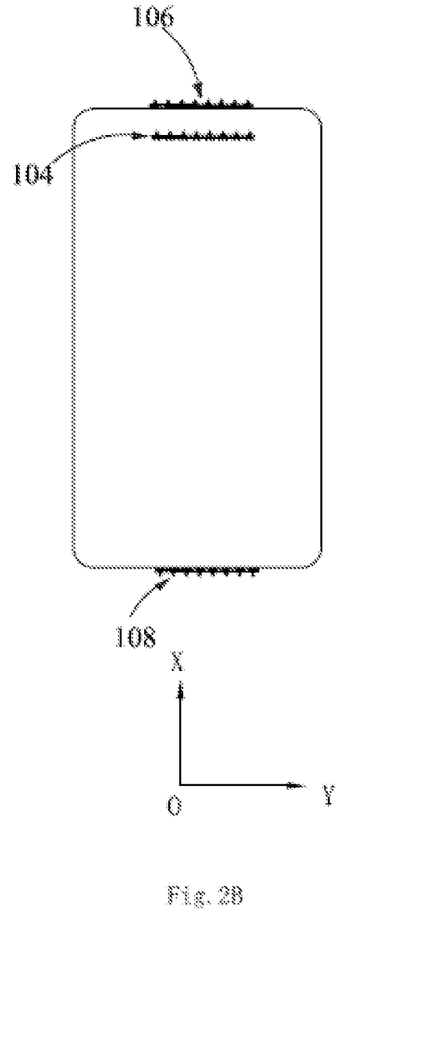
FIG. 2B is a diagram of the rear face of the mobile terminal provided by the first embodiment.

FIG. 2A shows a front face of a mobile terminal provided by the first embodiment, and FIG. 2B shows a rear face of the mobile terminal provided by the first embodiment. The four millimeter-wave array antennas, i.e., the first millimeter-wave array antenna 102, the second millimeter-wave array antenna 104, the third millimeter-wave array antenna 106 and the fourth millimeter-wave array antenna 108, are disposed in the antenna system involved in this embodiment in total.

Figure 3A:
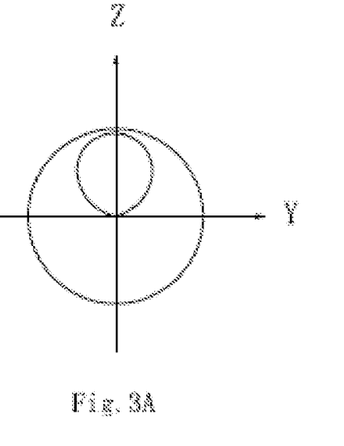
FIG. 3A is a diagram of the main beam of the first millimeter-wave array antenna pointing to a space of Z>0.
Figure 3B:
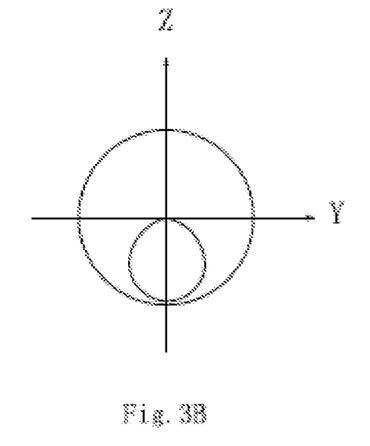
FIG. 3B is a diagram of the main beam of the second millimeter-wave array antenna pointing to a space of Z<0.
Figure 3C:
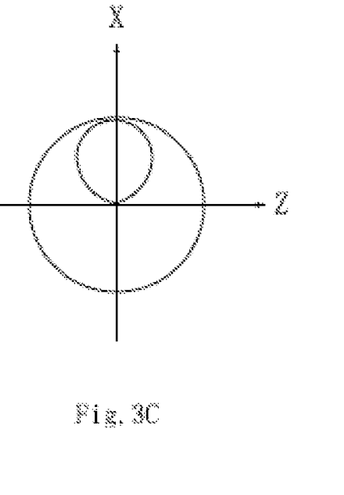
FIG. 3C is a diagram of the main beam of the third millimeter-wave array antenna pointing to a space of Y>0.
Figure 3D:
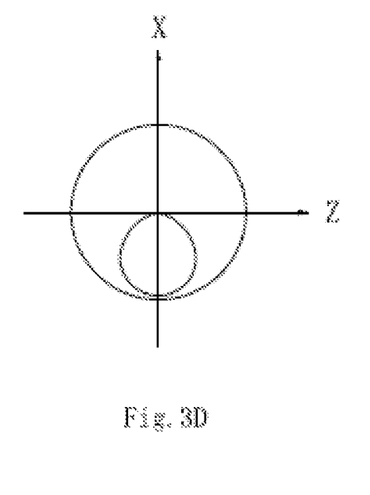
FIG. 3D is a diagram of the main beam of the fourth millimeter-wave array antenna pointing to a space of Y<0.

As shown in FIG. 3A, a main beam of the first millimeter-wave array antenna points to a space of $Z>0$. As shown in FIG. 3B, a main beam of the second millimeter-wave array antenna points to a space of $Z<0$. As shown in FIG. 3C, a main beam of the third millimeter-wave array antenna points to a space of $X>0$. As shown in FIG. 3D, a main beam of the fourth millimeter-wave array antenna points to a space of $X<0$.

Figure 4:
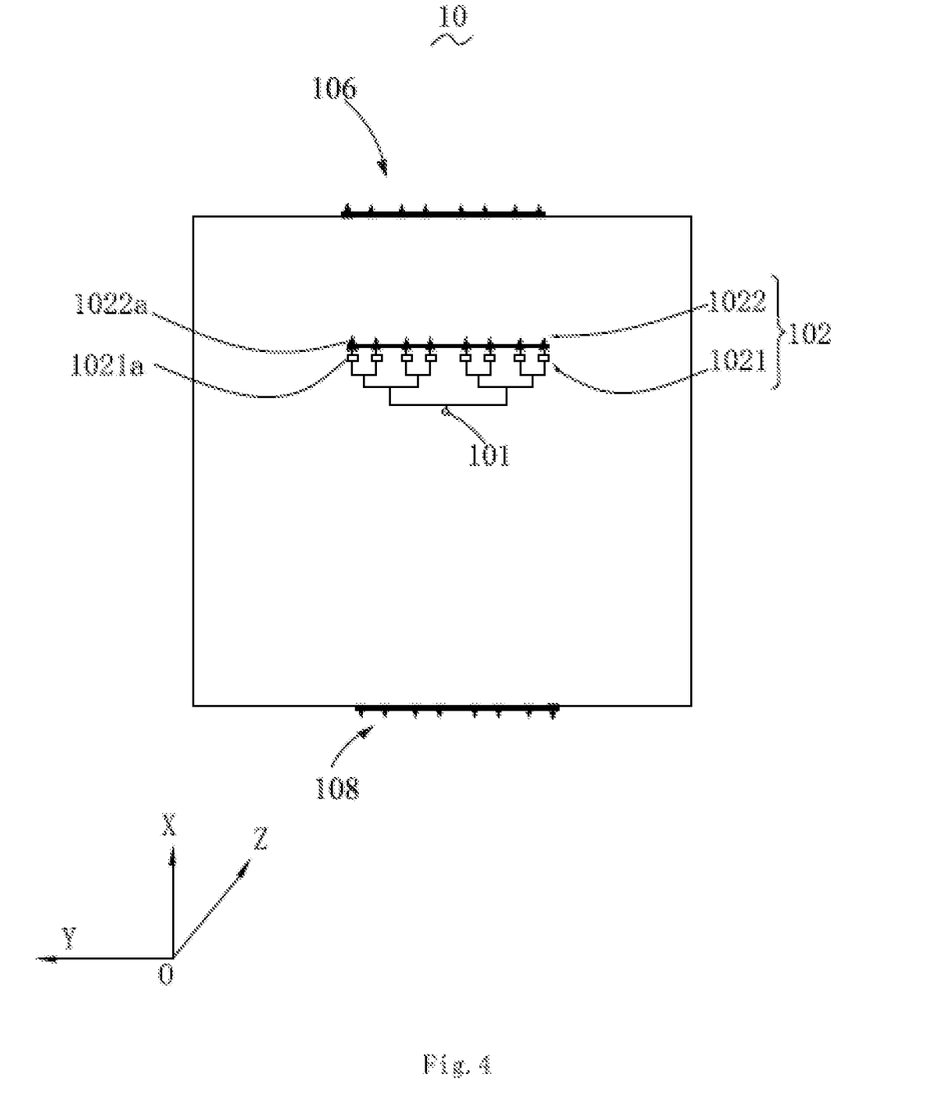
FIG. 4 is a specific structural diagram of the antenna system provided according to the first embodiment of the present disclosure when it faces a positive direction of a Z axis.
Figure 5:
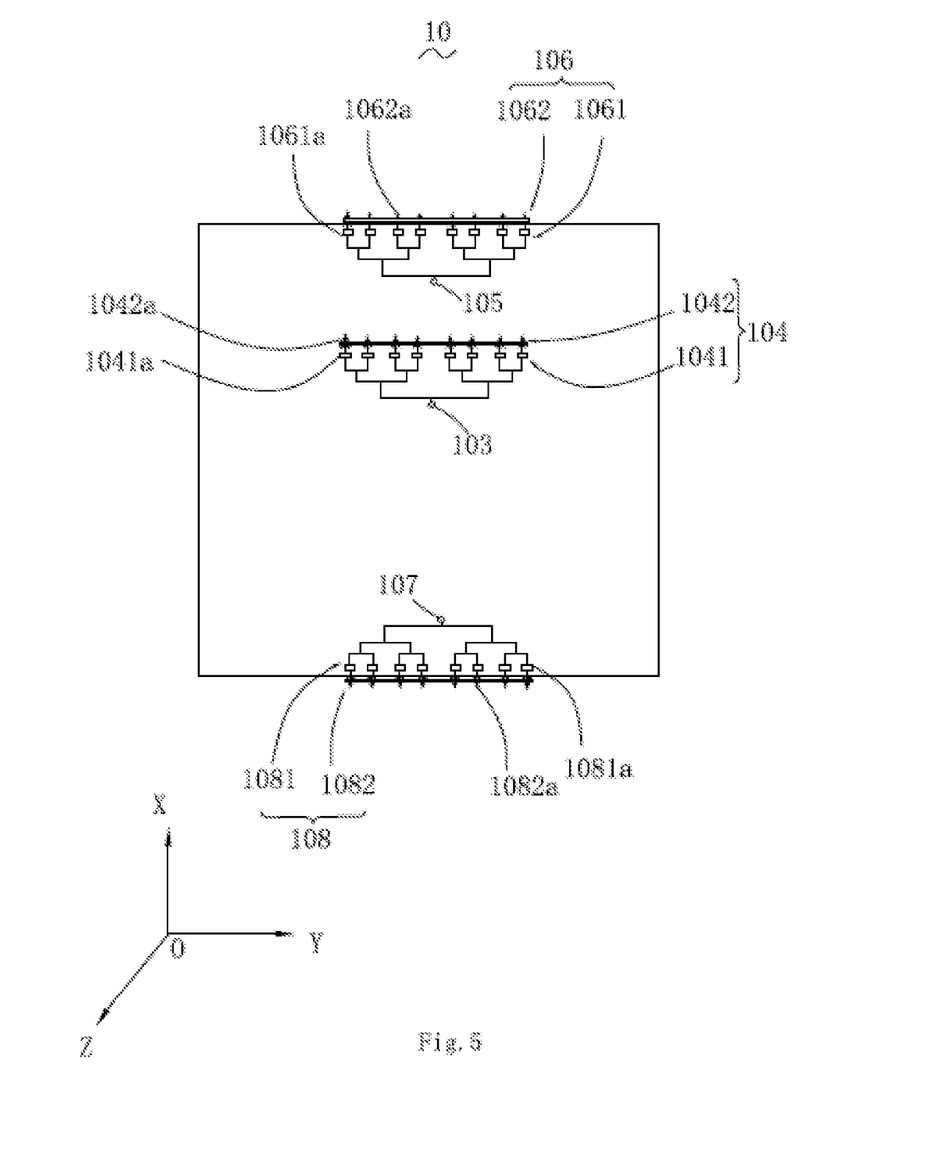
FIG. 5 is a specific structural diagram of the antenna system provided according to the first embodiment of the present disclosure when it faces away from the positive direction of the Z axis.

In one embodiment, the first feeding point 101, the second feeding point 103, the third feeding point 105 and the fourth feeding point 107 are arranged on the circuit board 303. The first millimeter-wave array antenna 102 includes a first feeding network 1021 connected to the first feeding point 101, and a first antenna array face 1022 fed by the first feeding network 1021. The second millimeter-wave array antenna 104 includes a second feeding network 1041 connected to the second feeding point 103, and a second antenna array face 1042 fed by the second feeding network 1041. The third millimeter-wave array antenna 106 includes a third feeding network 1061 connected to the third feeding point 105, and a third antenna array face 1062 fed by the third feeding network 1061. The fourth millimeter-wave array antenna 108 includes a fourth feeding network 1081 connected to the fourth feeding point 107, and a fourth antenna array face 1082 fed by the fourth feeding network 1081. The specific arrangement of the antenna system is as shown in FIGS. 4 and 5.

It is worth mentioning that the third feeding point and the fourth feeding point may be arranged on the same surface of the circuit board and may also not be arranged on the same surface of the circuit board. In this embodiment, the third feeding point and the fourth feeding point are arranged on the same surface of the circuit board.

The first antenna array face 1022 includes a plurality of first antenna units 1022a. The second antenna array face 1042 includes a plurality of second antenna units 1042a. The third antenna array face 1062 includes a plurality of third antenna units 1062a. The fourth antenna array face 1082 includes a plurality of fourth antenna units 1082a.

To be specific, the number of the first antenna units 1022a included in the first antenna array face 1022, the number of the second antenna units 1042a included in the second antenna array face 1042, the number of the third antenna units 1062a included in the third antenna array face 1062 and the number of the fourth antenna units 1082a included in the fourth antenna array face 1082 may be equal or may also not be equal. For example, the first antenna array face 1022 includes four first antenna units 1022a, the second antenna array face 1042 includes five second antenna units 1042a, the third antenna array face 1062 includes six third antenna units 1062a and the fourth antenna array face 1082 includes seven fourth antenna units 1082a.

In this embodiment, the number of the first antenna units 1022a, the number of the second antenna units 1042a, the number of the third antenna units 1062a and the number of the fourth antenna units 1082a are equal and are eight.

In this embodiment, the first feeding network 1021 includes a plurality of first phase shifters 1021a. The number of the first phase shifters 1021a is the same as the number of the first antenna units 1022a. Each of the first antenna units 1022a is electrically connected to the first feeding point 101 through one of the first phase shifters 1021a. The second feeding network 1041 includes a plurality of second phase shifters 1041a. The number of the second phase shifters 1041a is the same as the number of the second antenna units 1042a. Each of the second antenna units 1042a is electrically connected to the second feeding point 103 through one of the second phase shifters 1041a. The third feeding network 1061 includes a plurality of third phase shifters 1061a. The number of the third phase shifters 1061a is the same as the number of the third antenna units 1062a. Each of the third antenna units 1062a is electrically connected to the third feeding point 105 through one of the third phase shifters 1061a. The fourth feeding network 1081 includes a plurality of fourth phase shifters 1081a. The number of the fourth phase shifters 1081a is the same as the number of the fourth antenna units 1082a. Each of the fourth antenna units 1082a is electrically connected to the fourth feeding point 107 through one of the fourth phase shifters 1081a. A specific connection structure is as shown in FIGS. 4 and 5.

In this embodiment, the phase shifters are 5-bit phase shifters. The phase shift precision of each phase shifter is 11.25 degrees. Of course, the phase shift precision and the bit number of the phase shifter may be decided according to actual situations and are not limited.

It should be noted that although in this embodiment, each radiation unit is configured with one phase shifter, in other embodiments, one phase shifter may be configured commonly for multiple antenna units.

In this embodiment, each of the antenna arrays is a form of a one-dimensional linear array. The first antenna units 1022a, the second antenna units 1042a, the third antenna units 1062a and the fourth antenna units 1082a are respectively arranged into the one-dimensional linear array at intervals along a Y-axis direction. The first antenna array face 1022 and the second antenna array face 1042 are respectively arranged on two opposite sides in a Z-axis direction, the first antenna array face 1022 faces the positive axis of the Z axis and the second antenna array face 1042 faces a negative axis of the Z axis. The third antenna array face 1062 and the fourth antenna array face 1082 are respectively arranged on two opposite sides in an X-axis direction, and the third antenna array face 1062 faces the positive axis of the X axis and the fourth antenna array face 1082 faces a negative axis of the X axis, as shown in FIGS. 2A, 2B, 4 and 5.

The antenna system provided in this embodiment may control beam scanning of the antenna array through the phase shifter. Since the antenna array is in a form of a one-dimensional linear array, the phase shifter in each millimeter-wave array antenna only needs to scan one angle. Therefore, the scanning difficulty of the millimeter-wave array antenna is simplified.

It should be noted that an arrangement form of the antenna units and arrangement positions of the antenna arrays are not limited to this embodiment. In other embodiments, a planar array may be adopted, and the antenna arrays may also have other arrangement positions. For example, when an endfire array is used as the millimeter-wave array antenna, in order to make beams of the endfire array pointing to the positive-axis direction of the X axis, antenna elements of the endfire array may be arranged along the X axis unlike the third antenna array of the third millimeter-wave array antenna arranged along the Y axis in this embodiment.

In addition, the antenna array may be arranged on the circuit board, may also be arranged on a bracket, may be arranged on a shell by press fit, LDS and the like, and may also be a metal shell itself. A specific implementation mode of the antenna array is decided according to actual situations of the mobile terminal and is not limited in the present disclosure. For example, the first antenna array face 1022 may be directly arranged on the circuit board 303 and faces the surface of the screen 301, and may also be arranged on a front shell, which is parallel to and opposite to the screen, of the mobile terminal. The second antenna array face 1042 may be directly arranged on the circuit board 303 and may also be arranged on the back shell 302. The third antenna array face 1062 may be arranged on a top bracket of the circuit board 303 and may also be formed by a metal top frame itself. The fourth antenna array face 1082 may be arranged on a bottom bracket of the circuit board 303 and may also be formed by a metal bottom frame itself.

In this embodiment, both the first antenna array face 1022 and the second antenna array face 1042 are closer to the top of the mobile terminal, than to the bottom of the mobile terminal. The third antenna array is arranged at the top of the mobile terminal and the fourth antenna array is arranged at the bottom of the mobile terminal for the reason that a side frame, close to the bottom, of the mobile terminal is usually a handheld part of a user and the top and the bottom of the mobile terminal are least affected by the user, which facilitates signal propagation.

In addition, in the present disclosure, the four millimeter-wave array antennas are placed at positions very close to a mainboard or a small board, so that the line loss from a radio frequency front end (RFFE) to the antenna units may be reduced.

The operating principle and operating effects of the antenna system 10 will be described in detail below by taking the smart phone as an example.

Figure 6A:
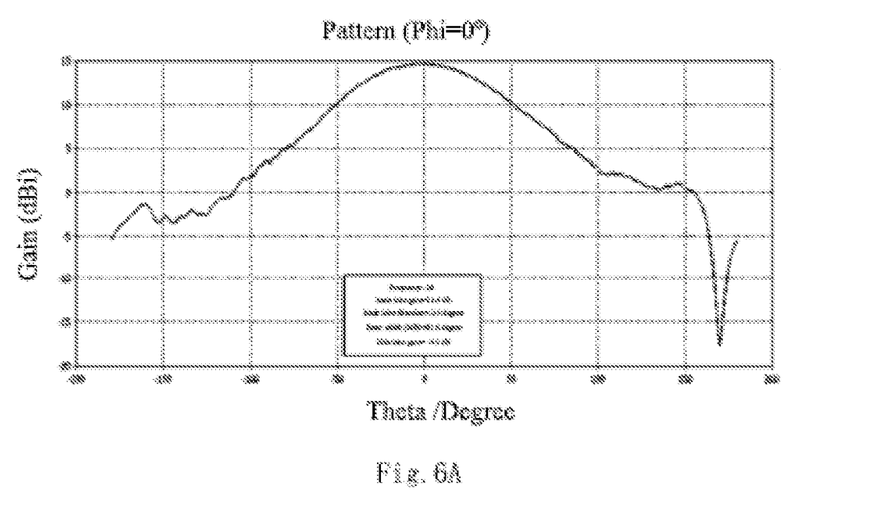
FIG. 6A is a pattern of a first millimeter-wave array antenna on an H plane when various first antenna units are fed at a constant amplitude and a same phase in the antenna system provided according to the first embodiment of the present disclosure.
Figure 6B:
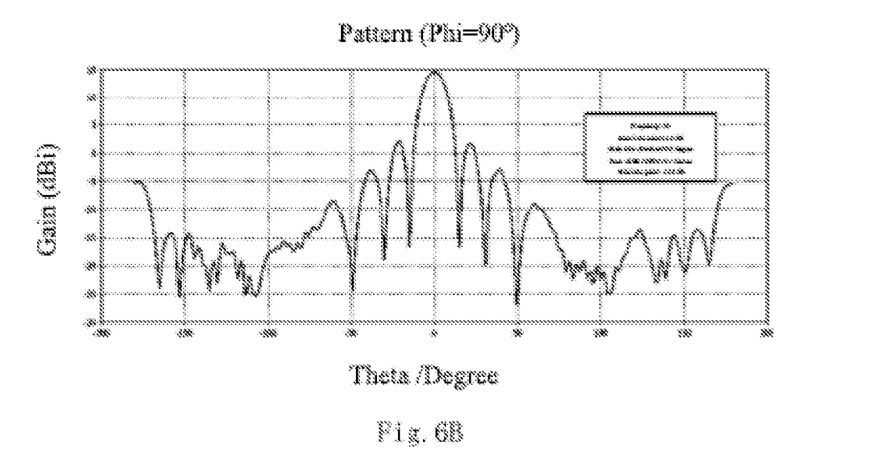
FIG. 6B is a pattern of the first millimeter-wave array antenna on an E plane when various first antenna units are fed at a constant amplitude and a same phase in the antenna system provided according to the first embodiment of the present disclosure.

As shown in FIG. 3A, by taking the first millimeter-wave array antenna 102 as an example, beams of the first millimeter-wave array antenna point to the space of Z>0. As shown in FIG. 6A and FIG. 6B, the first millimeter-wave array antenna 102 operates at 28 GHz. When various first antenna units 1022a are fed at a constant amplitude and a same phase, a main beam of the first millimeter-wave array antenna points to the direction of Theta=0°, i.e., the positive-axis direction of Z axis. The main beam of the first millimeter-wave array antenna has a wide beam in a plane of Phi=0° (XOZ) and has a relatively narrow beam in a plane of Phi=90° (YOZ). A 3 dB beam has the width of 13.1 degrees. The maximum gain of a main lobe is 14.6 dB and the gain of a side lobe is −12.6 dB.

The first millimeter-wave array antenna 102 achieves beam scanning in a half space of Z>0 along the YOZ plane through control over the phase of each of the first antenna units 1022a by the first phase shifter 1021a so as to overcome the defect of the relatively narrow beam in the YOZ plane.

Similarly, the second millimeter-wave array antenna 104 also has a wide beam in the plane of Phi=0° (XOZ) and may achieve beam scanning in the space of Z<0.

It can be seen that the second millimeter-wave array antenna 104 has relatively strong beam coverage in the space of Z<0, while the first millimeter-wave array antenna 102 has relatively strong beam coverage in the space of Z>0, and the first millimeter-wave array antenna 102 and the second millimeter-wave array antenna 104 are complementary to each other in beam coverage and together enhance the radiation capacity of an original weak radiation area.

Figure 7:
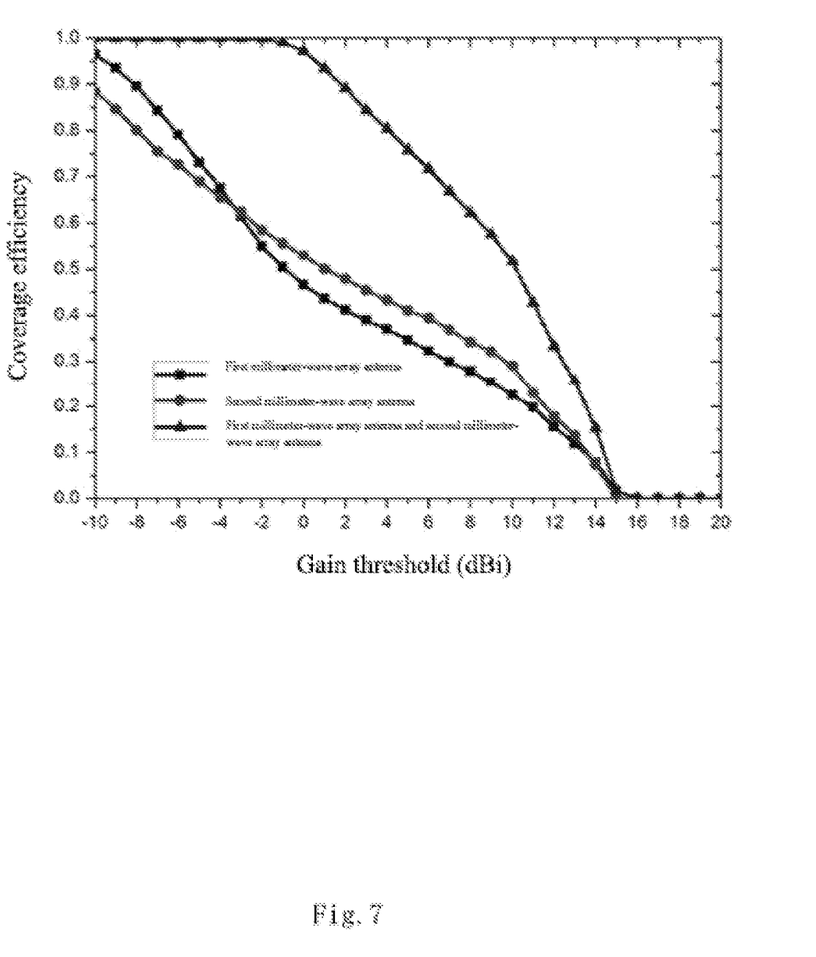
FIG. 7 is a radiation coverage efficiency diagram when the first millimeter-wave array antenna and a second millimeter-wave array antenna in the antenna system provided according to the first embodiment of the present disclosure operate.

When the first millimeter-wave array antenna 102 and the second millimeter-wave array antenna 104 operate independently or simultaneously, the beam coverage efficiency is as shown in FIG. 7. It can be seen from FIG. 7 that the beam coverage efficiency when the first millimeter-wave array antenna 102 and the second millimeter-wave array antenna 104 operate simultaneously is far greater than the beam coverage efficiency when the first millimeter-wave array antenna and the second millimeter-wave array antenna operate independently. The cooperation use of the first millimeter-wave array antenna 102 and the second millimeter-wave array antenna 104 improves the beam coverage efficiency of the antenna system.

Similarly, when various third antenna units 1062a of the third millimeter-wave array antenna 106 are fed at a constant amplitude and a same phase, a main beam of the third millimeter-wave array antenna points to the positive-axis direction of X axis, has a wide beam in the plane of XOZ and has a relatively narrow beam in the plane of YOZ. The third millimeter-wave array antenna achieves scanning through control by the phase shifter. The fourth millimeter-wave array antenna 108 is similar to the third millimeter-wave array antenna 106 except that the radiation directions are opposite. It can be seen that the third millimeter-wave array antenna 106 has relatively strong beam coverage in the space of X>0, while the fourth millimeter-wave array antenna 108 has relatively strong beam coverage in the space of X<0, and the third millimeter-wave array antenna 106 and the fourth millimeter-wave array antenna 108 are complementary to each other in beam coverage and together enhance the radiation capacity of an original weak radiation area.

Figure 8:
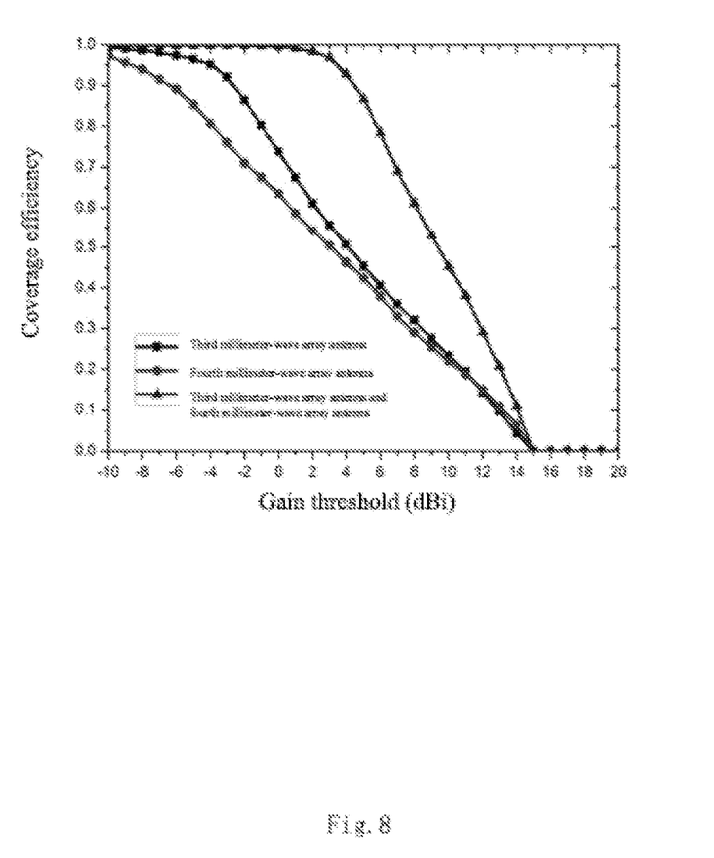
FIG. 8 is a radiation coverage efficiency diagram when a third millimeter-wave array antenna and a fourth millimeter-wave array antenna in the antenna system provided according to the first embodiment of the present disclosure operate.

When the third millimeter-wave array antenna 106 and the fourth millimeter-wave array antenna 108 operate independently or simultaneously, the beam coverage efficiency is as shown in FIG. 8. It can be seen from FIG. 8 that the beam coverage efficiency when the third millimeter-wave array antenna 106 and the fourth millimeter-wave array antenna 108 operate simultaneously is far greater than the beam coverage efficiency when the third millimeter-wave array antenna 106 and the fourth millimeter-wave array antenna 108 operate independently.

It is worth mentioning that although the third millimeter-wave array antenna 106 and the fourth millimeter-wave array antenna 108 have the wide beam in the plane of XOZ, the gain of the beam in the positive-axis direction and negative-axis direction of the Z axis and peripheral regions thereof is small, namely, the signal is weak. But the largest-beam pointing of the first millimeter-wave array antenna 102 is justly the positive-axis direction of the Z axis and the largest-beam pointing of the second millimeter-wave array antenna 104 is justly the negative-axis direction of the Z axis. Therefore, when a combination of the first millimeter-wave array antenna 102 and the second millimeter-wave array antenna 104 and a combination of the third millimeter-wave array antenna 106 and the fourth millimeter-wave array antenna 108 operate simultaneously, the coverage efficiency of the antenna system is further improved.

Figure 9:
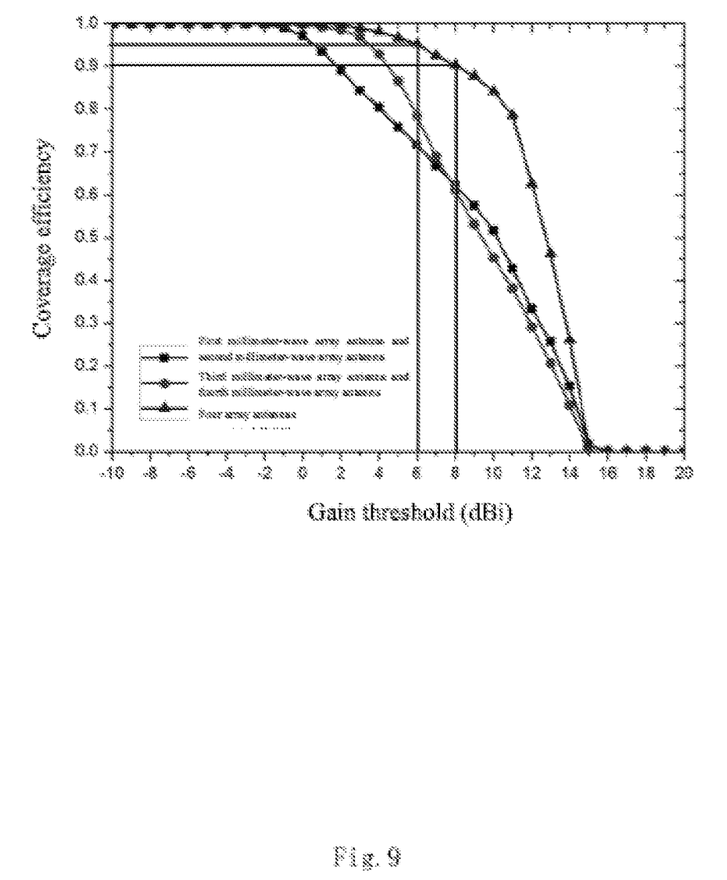
FIG. 9 is a radiation coverage efficiency diagram when four millimeter-wave array antennas in the antenna system provided according to the first embodiment of the present disclosure operate.

FIG. 9 is beam coverage efficiency diagram when the combination of the first millimeter-wave array antenna 102 and the second millimeter-wave array antenna 104 and the combination of the third millimeter-wave array antenna 106 and the fourth millimeter-wave array antenna 108 operate independently or simultaneously. It can be seen from FIG. 9 that the beam coverage efficiency when the four array antennas operate simultaneously is far greater than the beam coverage efficiency when the above two antenna combinations operate independently. It can be seen therefrom that in this embodiment, the beam coverage of the antenna system can be increased and the beam coverage efficiency of the antenna system can be improved.

Compared with the related art, the embodiment of the present disclosure has the advantages that for the antenna system, the beams of the first millimeter-wave array antenna cover the space of Z>0 and the beams of the second millimeter-wave array antenna cover the space of Z<0, so that a beam combination of the first millimeter-wave array antenna and the second millimeter-wave array antenna may cover the whole space. In addition, the beams of the third millimeter-wave array antenna cover the space of X>0 and the beams of the fourth millimeter-wave array antenna cover the space of X<0, so that the beam combination of the third millimeter-wave array antenna and the fourth millimeter-wave array antenna may cover the whole space. The combination of the first millimeter-wave array antenna, the second millimeter-wave array antenna, the third millimeter-wave array antenna and the fourth millimeter-wave array antenna further enhances the coverage efficiency of the antenna system, namely, there is relatively strong beam radiation in various directions of the space, thereby guaranteeing the signal receiving stability of the antenna system.

Figure 10:
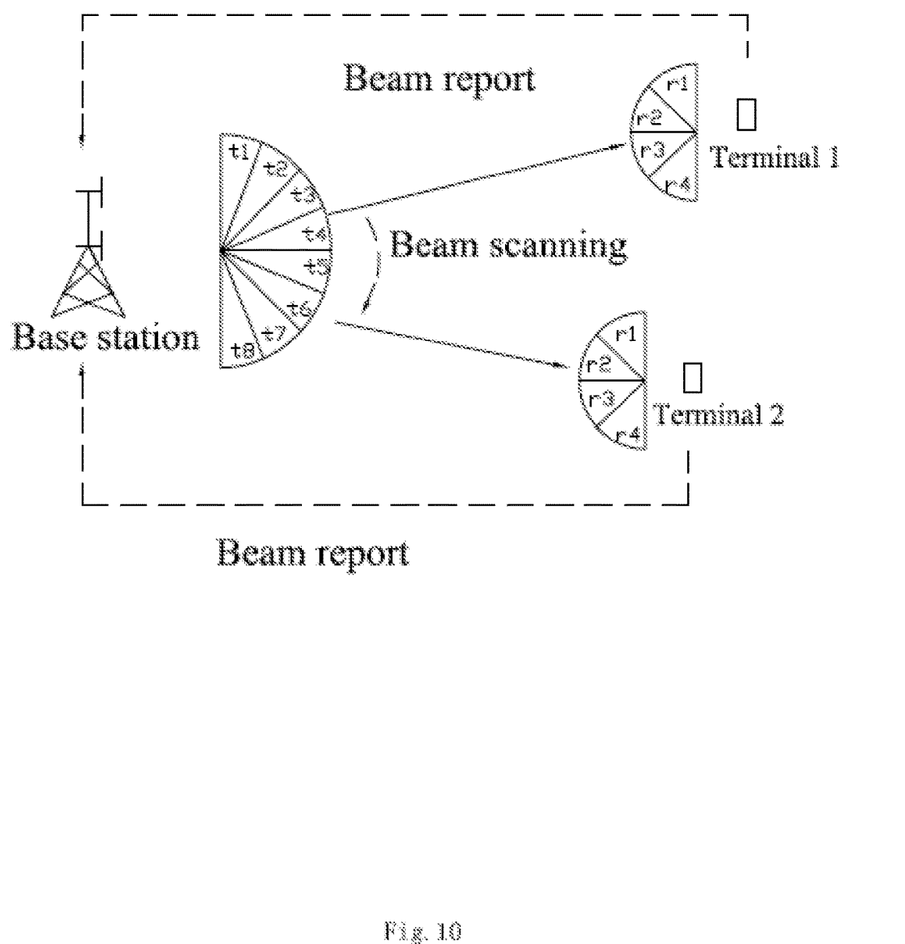
FIG. 10 is a diagram of beam management in the antenna system provided according to the first embodiment of the present disclosure.

In addition, in this embodiment, a base station and the mobile terminal are in communication connection using beam-forming technology. The core technology in this technology is beam management and the purpose thereof is to align the beam of the base station with the beam of the mobile terminal to maximize a receiving gain and a transmitting gain in a link. The beam management principle is as shown in FIG. 10: the base station sequentially uses different beams (such as t1-t8 in FIG. 10) to transmit wireless signals (beam scanning), the mobile terminal switches the beams (such as r1-r4 in FIG. 10) to receive the wireless signals and reports relevant information (a beam report) to the base station, and the mobile terminal determines, according to the received wireless signal with the maximum value, a preferable beam for receiving the wireless signals.

In this embodiment, the following beam management method may be adopted: the base station sequentially uses different beams to transmit wireless signals; the mobile terminal switches the beams to receive the wireless signals, determines a gain of a main lobe, facing the base station, of the first millimeter-wave array antenna 102 as a first gain, determines a gain of a main lobe, facing the base station, of the second millimeter-wave array antenna 104 as a second gain, determines a gain of a main lobe, facing the base station, of the third millimeter-wave array antenna 106 as a third gain, and determines a gain of a main lobe, facing the base station, of the fourth millimeter-wave array antenna 108 as a fourth gain, selects the first largest gain and the second largest gain from four antenna gains, and uses the millimeter-wave antenna array corresponding to the first largest gain and the millimeter-wave antenna array corresponding to the second largest gain as millimeter-wave antenna arrays for signal transmission, thereby achieving MIMO or diversity of antennas and further guaranteeing the signal transmission accuracy and stability of the antenna system. Of course, in other embodiments, other beam management methods may be adopted. Here is only an example, and no matter which beam management method is adopted, the layout of the antenna system in this embodiment is not affected.

The second embodiment of the present disclosure relates to a mobile terminal 30 including the antenna system 10.

Figure 11:
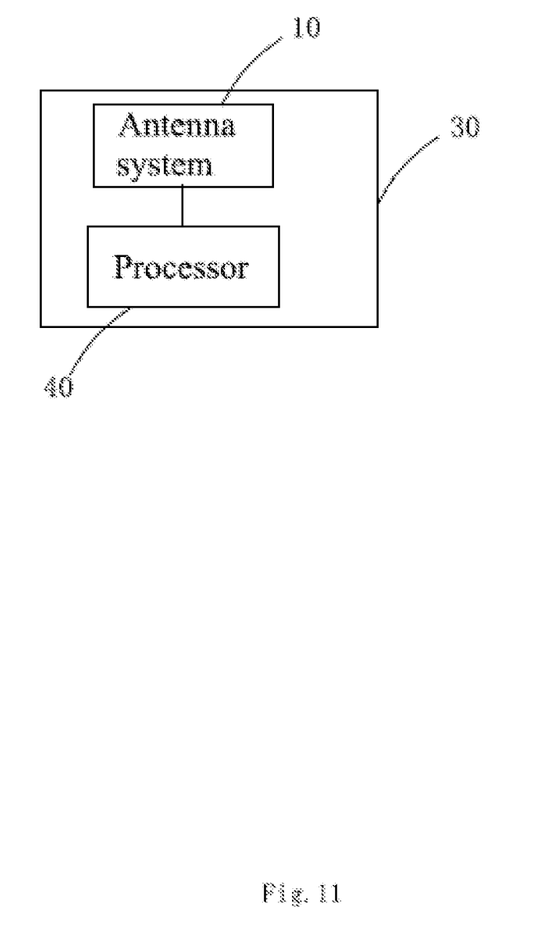
FIG. 11 is a structural diagram of a mobile terminal provided according to the second embodiment of the present disclosure.

Preferably, the mobile terminal 30 further includes a processor 40. The structure of the mobile terminal is as shown in FIG. 11. The processor 40 is specifically configured to: determine the gain of a main lobe, facing the base station, of the first millimeter-wave array antenna as a first gain, determine the gain of a main lobe, facing the base station, of the second millimeter-wave array antenna as a second gain, determine the gain of a main lobe, facing the base station, of the third millimeter-wave array antenna as a third gain, determine the gain of a main lobe, facing the base station, of the fourth millimeter-wave array antenna as a fourth gain, select two gains from the first gain, the second gain, the third gain and the fourth gain according to a descending order and use the array antennas corresponding to the selected two gains for signal transmission.

To be specific, the base station sequentially uses different beams to transmit wireless signals. The processor switches the beams to receive the wireless signals, determines the gain of a main lobe, facing the base station, of the first millimeter-wave array antenna as a first gain, determines the gain of a main lobe, facing the base station, of the second millimeter-wave array antenna as a second gain, determines the gain of a main lobe, facing the base station, of the third millimeter-wave array antenna as a third gain, and determines the gain of a main lobe, facing the base station, of the fourth millimeter-wave array antenna as a fourth gain. The processor 40 selects the first largest gain and the second largest gain from the first gain, the second gain, the third gain and the fourth gain, and uses the array antenna corresponding to the first largest gain and the array antenna corresponding to the second largest gain as the array antennas for signal transmission, thereby realizing MIMO or diversity of antennas and further guaranteeing the signal transmission accuracy and stability of the antenna system. For example, it is assumed that the first gain is A(dB), the second gain is B(dB), the third gain is C(dB), the fourth gain is D(dB) and A<B<C<D, the first gain is determined as the first largest gain, the second gain is determined as the second largest gain, and the first millimeter-wave array antenna and the second millimeter-wave array antenna are used for signal transmission.

Figure 12:
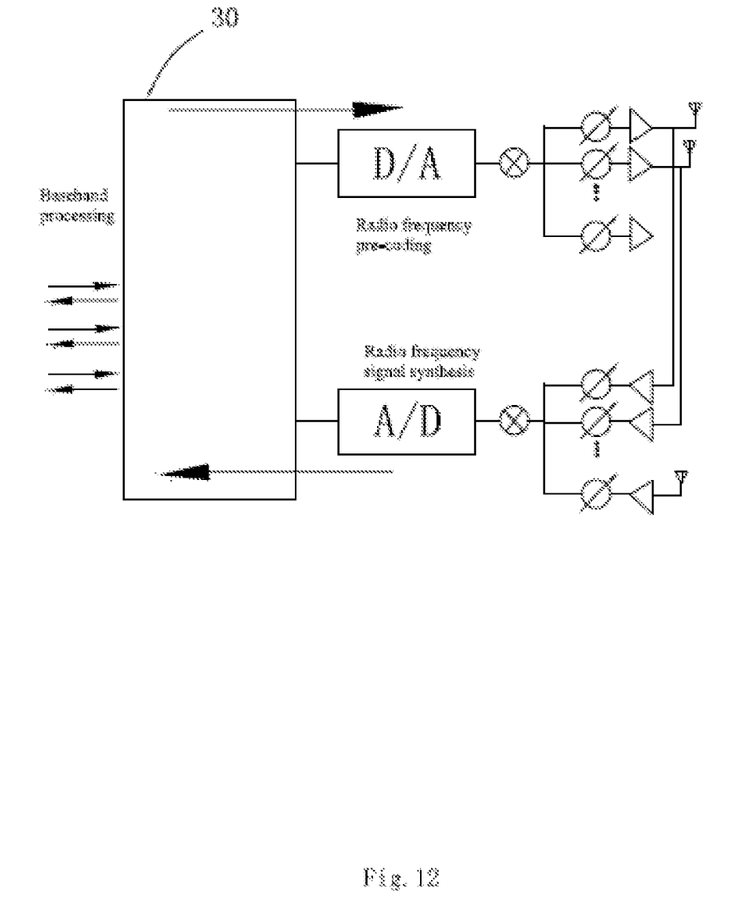
FIG. 12 is an architecture diagram of an antenna system in the mobile terminal provided according to the second embodiment of the present disclosure.

It is worth mentioning that the antenna system in the mobile terminal adopts phased array architecture. The phased array architecture is as shown in FIG. 12.

In the mobile terminal provided in this embodiment, the processor determines two millimeter-wave array antennas for signal transmission through beam management, so that the field strength covered by the overall radiation is more balanced, thereby avoiding the situation that edge radiation is weak under single combination. In addition, the use of two millimeter-wave array antennas simultaneously achieves multi-input multi-output (MIMO) or diversity of the antennas, thereby enhancing the signal receiving capacity of the mobile terminal.

It may be understood by a person skilled in the art that all or part of steps of methods for implementing the above embodiments may be completed by a program instructing relevant hardware, the program is stored in a storage medium, and includes several instructions to cause one device (which may be a single chip microcomputer, a chip and the like) or a processor to execute all or part of steps of the methods set forth in various embodiments of the present disclosure. The foregoing storage medium includes various media which may store program codes, such as a U disk, a mobile hard disk, a read-only memory (ROM), a random access memory (RAM), a magnetic disk or an optical disk.

It may be understood by an ordinary person skilled in the art that the above embodiments are specific embodiments for implementing the present disclosure and that various changes may be made in forms and details without departing from the spirit and scope of the present disclosure in practical application.

What is claimed is:

1. An antenna system applied to a mobile terminal which is provided with a screen, a back shell opposite to the screen and a circuit board sandwiched between the screen and the back shell, the antenna system comprising:
   a first feeding point;
   a first millimeter-wave array antenna electrically connected to the first feeding point;
   a second feeding point;
   a second millimeter-wave array antenna electrically connected to the second feeding point;
   a third feeding point;
   a third millimeter-wave array antenna electrically connected to the third feeding point;
   a fourth feeding point; and
   a fourth millimeter-wave array antenna electrically connected to the fourth feeding point, which are all arranged on the circuit board,
   wherein when the mobile terminal is placed in a three-dimensional coordinate system which takes a center of the mobile terminal as an origin, an X axis of the three-dimensional coordinate system extends along a major-axis direction of the mobile terminal, a Y axis of the three-dimensional coordinate system extends along a minor-axis direction of the mobile terminal, a Z axis of the three-dimensional coordinate system extends along a thickness direction of the mobile terminal, a positive axis of the X axis points to a top of the mobile terminal, and a positive axis of the Z axis points to the screen,
   beams of the first millimeter-wave array antenna achieves beam scanning in a space of Z>0,
   beams of the second millimeter-wave array antenna achieves beam scanning in a space of Z<0,
   beams of the third millimeter-wave array antenna achieves beam scanning in a space of X>0, and
   beams of the fourth millimeter-wave array antenna achieves beam scanning in a space of X<0.

2. The antenna system according to claim 1, wherein the first millimeter-wave array antenna comprises a first feeding network connected to the first feeding point, and a first antenna array face fed by the first feeding network;
   the second millimeter-wave array antenna comprises a second feeding network connected to the second feeding point, and a second antenna array face fed by the second feeding network;
   the third millimeter-wave array antenna comprises a third feeding network connected to the third feeding point, and a third antenna array face fed by the third feeding network; and
   the fourth millimeter-wave array antenna comprises a fourth feeding network connected to the fourth feeding point, and a fourth antenna array face fed by the fourth feeding network.

3. The antenna system according to claim 2, wherein the first antenna array face and the second antenna array face are respectively arranged on two opposite sides in a Z-axis direction, the first antenna array face faces a positive axis of the Z axis and the second antenna array face faces a negative axis of the Z axis; and
   the third antenna array face and the fourth antenna array face are respectively arranged on two opposite sides in an X-axis direction, the third antenna array face faces a positive axis of the X axis and the fourth antenna array face faces a negative axis of the X axis.

4. The antenna system according to claim 3, wherein both the first antenna array face and the second antenna array face are closer to the top of the mobile terminal, than to a bottom of the mobile terminal; and
   wherein the third antenna array face is arranged at the top of the mobile terminal, and the fourth antenna array face is arranged at the bottom of the mobile terminal.

5. The antenna system according to claim 3, wherein the first antenna array face comprises a plurality of first antenna units, the second antenna array face comprises a plurality of second antenna units, the third antenna array face comprises a plurality of third antenna units, and the fourth antenna array face comprises a plurality of fourth antenna units.

6. The antenna system according to claim 5, wherein the plurality of first antenna units, the plurality of second antenna units, the plurality of third antenna units and the plurality of fourth antenna units are respectively arranged into a one-dimensional linear array at intervals along a Y-axis direction.

7. The antenna system according to claim 6, wherein
the first feeding network comprises a plurality of first phase shifters, a number of the plurality of first phase shifters is the same as a number of the plurality of first antenna units, and each of the plurality of first antenna units is electrically connected to the first feeding point through one of the plurality of first phase shifters;
the second feeding network comprises a plurality of second phase shifters, a number of the plurality of second phase shifters is the same as a number of the plurality of second antenna units, and each of the plurality of second antenna units is electrically connected to the second feeding point through one of the plurality of second phase shifters;
the third feeding network comprises a plurality of third phase shifters, a number of the plurality of third phase shifters is the same as a number of the plurality of third antenna units, and each of the plurality of third antenna units is electrically connected to the third feeding point through one of the plurality of third phase shifters; and
the fourth feeding network comprises a plurality of fourth phase shifters, a number of the plurality of fourth phase shifters is the same as a number of the plurality of fourth antenna units, and each of the plurality of fourth antenna units is electrically connected to the fourth feeding point through one of the plurality of fourth phase shifters.

8. A mobile terminal, comprising the antenna system according to claim 1.

9. The mobile terminal according to claim 8, comprising a processor configured to:
determine a gain of a main lobe, facing the base station, of the first millimeter-wave array antenna as a first gain, determine a gain of a main lobe, facing the base station, of the second millimeter-wave array antenna as a second gain, determine a gain of a main lobe, facing the base station, of the third millimeter-wave array antenna as a third gain, determine a gain of a main lobe, facing the base station, of the fourth millimeter-wave array antenna as a fourth gain, and
select two gains from the first gain, the second gain, the third gain and the fourth gain according to a descending order, and use the millimeter-wave array antennas corresponding to the selected two gains for signal transmission.

* * * * *